(12) United States Patent
Oh et al.

(10) Patent No.: US 10,535,885 B2
(45) Date of Patent: Jan. 14, 2020

(54) FUEL CELL STACK HAVING IMPROVED CONDENSATE MANAGEMENT

(71) Applicant: HYUNDAI MOTOR COMPANY, Seoul (KR)

(72) Inventors: Jongkil Oh, Yongin-si (KR); Seongil Heo, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 310 days.

(21) Appl. No.: 15/373,164

(22) Filed: Dec. 8, 2016

(65) Prior Publication Data

US 2018/0034084 A1      Feb. 1, 2018

(30) Foreign Application Priority Data

Jul. 29, 2016   (KR) ........................ 10-2016-0097320

(51) Int. Cl.
| | |
|---|---|
| *H01M 8/04291* | (2016.01) |
| *H01M 8/0265* | (2016.01) |
| *H01M 8/04119* | (2016.01) |
| *H01M 8/241* | (2016.01) |
| *H01M 8/0273* | (2016.01) |

(52) U.S. Cl.
CPC ..... *H01M 8/04291* (2013.01); *H01M 8/0265* (2013.01); *H01M 8/04156* (2013.01); *H01M 8/241* (2013.01); *H01M 8/0273* (2013.01)

(58) Field of Classification Search
CPC ....... H01M 2008/1095; H01M 8/0265; H01M 8/0267; H01M 8/0273; H01M 8/0276; H01M 8/04156; H01M 8/04291; H01M 8/241
See application file for complete search history.

(56) References Cited

U.S. PATENT DOCUMENTS

2015/0093663 A1* 4/2015 Ikoma ................... H01M 8/026
429/414

FOREIGN PATENT DOCUMENTS

| JP | 2006-024404 A | 1/2006 |
|---|---|---|
| JP | 2010-182624 A | 8/2010 |
| JP | 2011-154799 A | 8/2011 |
| KR | 10-2011-0015924 A | 2/2011 |
| KR | 10-1601382 B1 | 3/2016 |

* cited by examiner

*Primary Examiner* — Stewart A Fraser
*Assistant Examiner* — Victoria H Lynch
(74) *Attorney, Agent, or Firm* — Morgan, Lewis & Bockius LLP

(57) ABSTRACT

A fuel cell stack includes a membrane electrode assembly including a cathode and an anode which are catalyst layers and are formed on a first and a second surface, respectively, of an electrolyte membrane, a first separator disposed at one side of the membrane electrode assembly, and a second separator disposed at the other side of the membrane electrode assembly, wherein a gas path through which a gas is discharged from the cathode or the anode, or a gas is supplied to the cathode or the anode, is disposed between the second separator and the membrane electrode assembly and is formed in a non-reaction zone, and wherein the gas path includes a flow path expansion portion and a height of the flow path expansion portion is greater than a height of a reaction zone.

14 Claims, 7 Drawing Sheets

(a) D-D cross section (b) E-E cross section

FUEL CELL STACK HAVING IMPROVED CONDENSATE MANAGEMENT

CROSS-REFERENCE TO RELATED APPLICATION

This application claims priority to and the benefit of Korean Patent Application No. 10-2016-0097320 filed in the Korean Intellectual Property Office on Jul. 29, 2016, the entire contents of which are incorporated herein by reference.

TECHNICAL FIELD

The present disclosure relates to a fuel cell stack that may stably maintain and improve performance of a fuel cell by easily discharging condensate formed by a gas discharged from an anode or a cathode of a membrane electrode assembly (MEA).

BACKGROUND

A membrane electrode assembly (MEA) is generally located in the middle of a fuel cell stack and includes a polymer electrolyte membrane, through which hydrogen ions (protons) are transported, and an catalyst layer such as a cathode and an anode, in which an electrochemical reaction between hydrogen and oxygen takes place, disposed on each of both sides of the polymer electrolyte membrane.

A gas diffusion layer and a gasket are sequentially stacked on both sides of the MEA, where the cathode and the anode are located. A separator including flow fields for supplying fuel and discharging water generated by the reaction is located on the outside of the GDL, and an end plate for supporting and fixing the above-described components is connected to each of both ends thereof.

At the anode of the fuel cell stack, hydrogen is dissociated into hydrogen ions (protons, H+) and electrons (e−) by an oxidation reaction of hydrogen. The hydrogen ions and electrons are transmitted to the cathode through the electrolyte membrane and an external circuit respectively. At the cathode, water is produced by an electrochemical reaction in which the hydrogen ions and electrons transmitted from the anode and the oxygen in air participate and, at the same time, electrical energy is produced by the flow of electrons.

The gasket, which is disposed between the separator and the MEA, serves as a guide that moves the air and hydrogen to the anode and the cathode, and the gasket serves as a gas path that discharges a reaction gas generated in the catalyst layer.

Condensate is formed in the gas path through which the reaction gas or the air passes, and the condensate can block the gas path. Thus, performance of the fuel cell stack cannot be stably maintained, and can be decreased.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a fuel cell stack that may stably maintain and improve performance of a fuel cell by easily discharging condensate formed by a reaction gas discharged from an anode or a cathode of a membrane electrode assembly (MEA).

Exemplary embodiments of the present disclosure may provide a fuel cell stack, including: a membrane electrode assembly that includes a cathode and an anode which are catalyst layers and are formed on both surfaces of an electrolyte membrane; a first separator that is disposed at one side of the membrane electrode assembly; and a second separator that is disposed at the other side of the membrane electrode assembly. A gas path through which a gas is discharged from the cathode or the anode, or a gas is supplied to the cathode or the anode flows is disposed between the second separator and the membrane electrode assembly and may be formed in a non-reaction zone. The gas path may include a flow path expansion portion and a height of the flow path expansion portion may be greater than a height of a reaction zone.

The flow path expansion portion may include a portion of which a height gradually increases from the gas path.

The flow path expansion portion may be formed at one side surface of the membrane electrode assembly, and a height of one side of the membrane electrode assembly forming the flow path expansion portion may decrease.

A gas hole connected to the gas path may be formed at the second separator

The flow path expansion portion may be formed by deforming a shape of the membrane electrode assembly.

The fuel cell stack may further include: a first gasket that is disposed between the membrane electrode assembly and the first separator in the non-reaction zone; and a second gasket that corresponds to the first gasket and is disposed between the membrane electrode assembly and the second separator. The flow path expansion portion may be formed by using the cross-sectional shapes of the first gasket and second gasket to deform the shape of the membrane electrode assembly.

A portion using cross-sectional shapes of the first gasket and second gasket to deform the shape of the membrane electrode assembly may be a secondary gasket.

An outer side surface of the first gasket may have a first thickness, an inner side surface of the first gasket may have a second thickness less than the first thickness, the outer side surface of the second gasket may have a third thickness, and the inner side surface of the second gasket may have a fourth thickness greater than the third thickness. An inclined portion that is disposed in a region between the outer side surface and the inner side surface may change thicknesses of the first gasket and the second gasket.

A sum of the first thickness and the third thickness may be equal to a sum of the second thickness and the fourth thickness.

The gas path may discharge a fuel gas discharged from the anode or a gas discharged from the cathode.

A point at which the inclined portion starts with respect to a direction directed from the outer side surface toward the inner side surface may be included in a region of the gas hole.

The flow path expansion portion may be overlapped with part of a region of the gas hole.

The flow path expansion portion may be overlapped with all of a region of the gas hole.

The second separator may be disposed at a side at which the cathode is disposed and may form a channel that passes air in the reaction zone.

The second separator may be disposed at a side at which the anode is disposed and may form a channel that passes a fuel gas in the reaction zone.

The flow path expansion portion is formed at an outlet of the gas discharged from the cathode or the anode.

DETAILED DESCRIPTION

Figure 1:
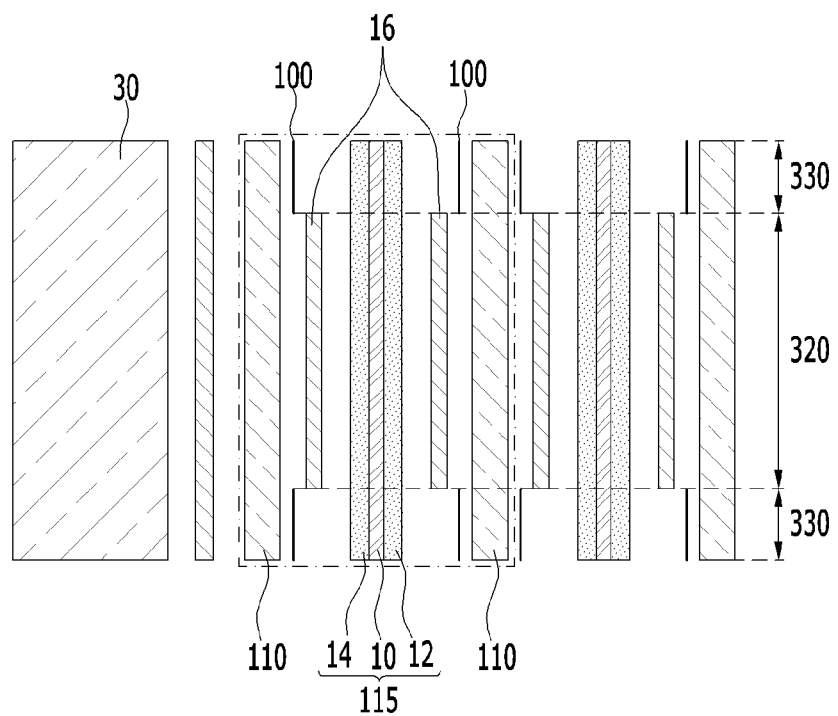
FIG. 1 is an exploded sectional view of a fuel cell according to exemplary embodiments of the present disclosure.

Exemplary embodiments of the present disclosure will hereinafter be described in detail with reference to the accompanying drawings.

The sizes and thicknesses of the configurations shown in the drawings are provided selectively for the convenience of description, such that the present disclosure is not limited to those shown in the drawings, and the thicknesses may be exaggerated to make some parts and regions clear.

However, parts which are not related to the description are omitted for clearly describing the exemplary embodiments of the present disclosure, and like reference numerals refer to like or similar elements throughout the specification.

In the following description, dividing names of components into first, second, and the like is because the names of the components are the same as each other, and an order thereof is not particularly limited.

In exemplary embodiments of the present disclosure, a gas path 340 of FIG. 3 may be commonly applied to an outlet of a fuel gas and an outlet of air. The gas path 340 may be evenly applied to a discharge side and a supply side.

FIG. 1 is an exploded sectional view of a fuel cell according to exemplary embodiments of the present disclosure.

Referring to FIG. 1, a fuel cell stack (or a fuel cell) includes a membrane electrode assembly (MEA) 115 that includes an electrolyte membrane 10, an anode 14, and a cathode 12, a gas diffusion layer 16 disposed on both sides of the MEA 115, a separator (or a separating plate) 110 disposed on an outer surface of the gas diffusion layer and a gasket 100 that is disposed in a non-reaction zone 330 between the separator and the gas diffusion layer. An end plate 30 may be disposed on both ends of the fuel cell stack. The non-reaction zone 330 may be included in the fuel cell stack.

The electrolyte membrane 10 may provide a path for moving a hydrogen ion, and the anode 14 and the cathode 12 may be a catalyst layer for reactions of hydrogen and oxygen.

The gas diffusion layer 16 may diffuse air and the hydrogen to the cathode 12 and the anode 14, and the separator 110 may form an air path for passing the air and a gas path for passing a fuel gas in a reaction zone 320. The reaction zone may include the MEA 115.

The gasket 100 may be disposed in the non-reaction zone 330 between the separator 110 and the electrolyte membrane 10 or disposed between the separator and the MEA 115 so that the gasket forms the gas path 340 of air or a fuel gas that is supplied or discharged to the reaction zone 320.

Figure 2:
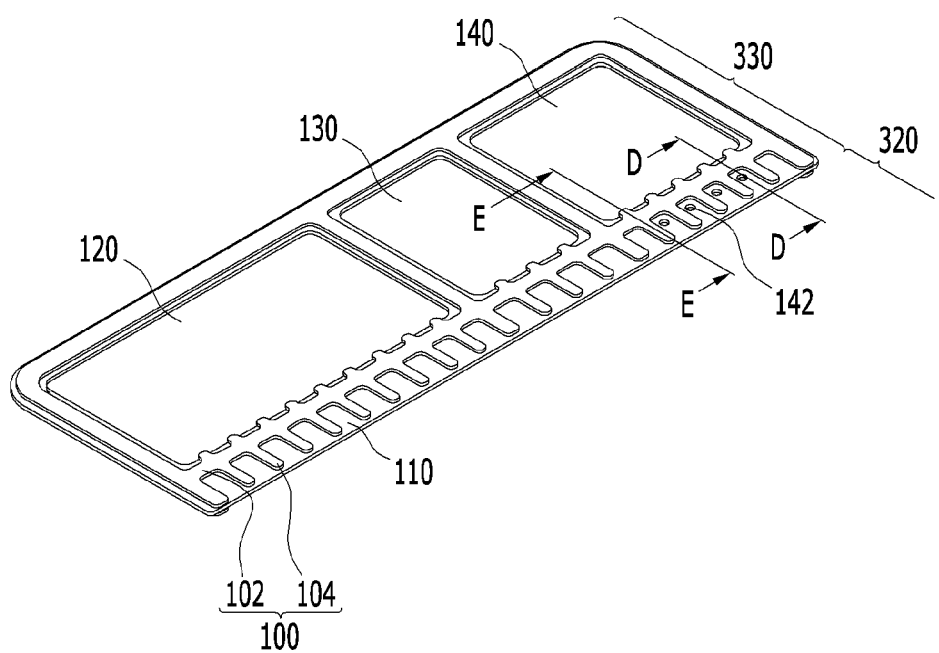
FIG. 2 is a perspective view of a fuel cell according to exemplary embodiments of the present disclosure.

FIG. 2 is a perspective view of a fuel cell according to exemplary embodiments of the present disclosure.

Referring to FIG. 2, the gasket 100 may be disposed in the non-reaction zone 330 of the fuel cell and may include a main gasket 102 and a secondary gasket 104. The separator 110 may be disposed adjacent to the gasket 100.

An air manifold 120, a coolant manifold 130, and a hydrogen manifold 140 may be formed in the non-reaction zone 330 in a stacking direction of the gasket 100 and the separator 110. The air may pass through the air manifold 120, a coolant may pass through the coolant manifold 130 and the hydrogen that is the fuel gas may pass through the hydrogen manifold 140.

The hydrogen, the air, and the coolant may be supplied to a reaction zone 320 of the MEA 115 through the hydrogen manifold 140, the air manifold 120 and the coolant manifold 130 so that the hydrogen, the air and the coolant perform a function of generating an electric current and a cooling function.

In exemplary embodiments of the present disclosure, the main gasket 102 may include a cross section along a D-D line and a cross section along an E-E line in FIG. 2, and the secondary gasket 104 may include, or be shown by, only the cross section along the E-E line.

Figure 3A:
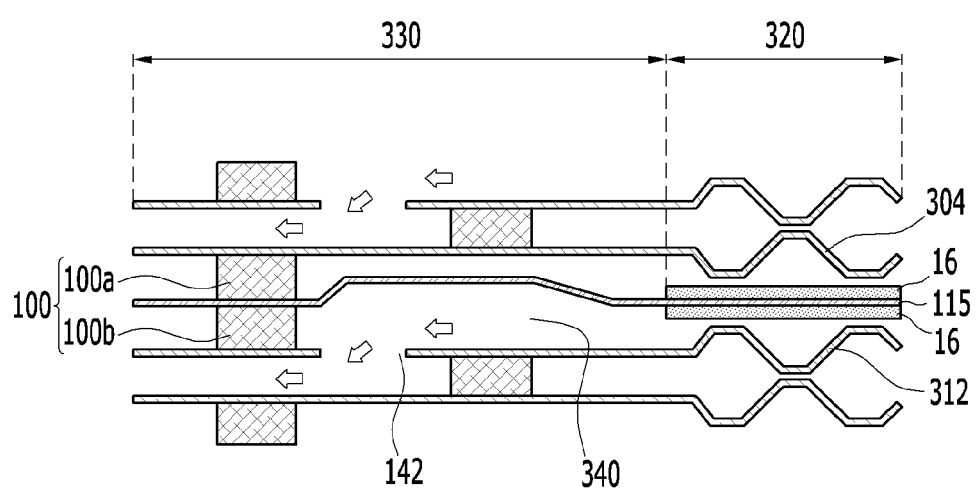
FIG. 3a is a cross-sectional view along D-D line in FIG. 2.
Figure 3B:
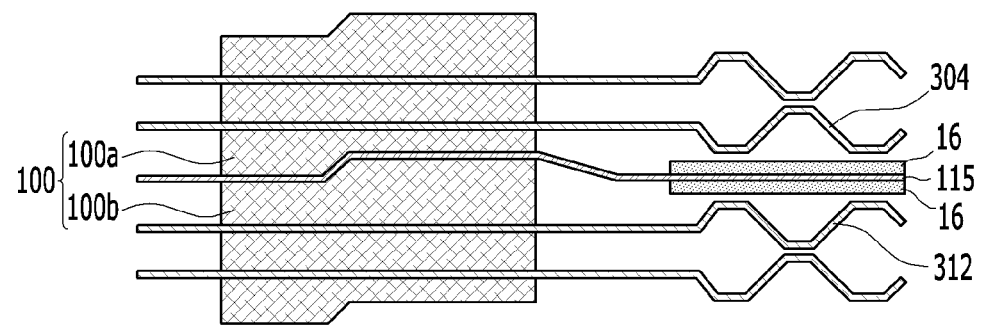
FIG. 3b is a cross-sectional view along E-E line of FIG. 2.

FIG. 3a is a cross-sectional view along the D-D line in FIG. 2, and FIG. 3b is a cross-sectional view along the E-E line of FIG. 2.

Referring to FIG. 1 and FIG. 3a, the fuel cell may include the MEA 115 that includes the electrolyte membrane 10, the anode 14 and the cathode 12, the gas diffusion layer 16 that is disposed on both surfaces of the MEA 115 and is disposed in the reaction zone 320, and a first separator 304 and a second separator 312 that are disposed in the non-reaction zone 330 and the reaction zone 320.

The gasket 100 may be disposed in the non-reaction zone 330, and may include a first gasket 100a disposed between the first separator 304 and the MEA 115 and a second gasket 100b disposed between the separator 312 and the MEA 115.

As shown in FIG. 3a, a gas hole 142 may be formed in the non-reaction zone 330 of the second separator 312, and the gas passing through the reaction zone 320 may move through the gas hole 142. The gas may be moved through the gas hole 142 to the reaction zone 320.

The second gasket 100b may form a space corresponding to the gas hole 142 and may form the gas path 340 between the MEA 115 and the second separator 312. The fuel gas or the air may move through the gas path 340.

As a shape of the gas path 340, the second separator 312 at which the gas hole 142 is formed may be formed at a constant height, and the MEA 115 facing the second separator 312 may include a shape in which, from the reaction zone 320 toward the non-reaction zone 330, a height of the MEA 115 is gradually increased, then is maintained at a constant height and then is gradually decreased.

Thus, a space between the MEA 115 and the first separator 304 corresponding to the gas path 340 may be reduced and a height of the gas path 340 may be enlarged so that condensate formed by the gas that is formed in the MEA 115 may be easily discharged (or released).

In exemplary embodiments of the present disclosure, a portion expanded by increasing the height of the gas path 340 may be referred to as a flow path expansion portion.

Referring to FIG. 3b, the gasket 100 of the fuel cell may be disposed in the non-reaction zone 330, and may include the first gasket 100a disposed between the first separator 304 and the MEA 115 and the second gasket 100b disposed between the separator 312 and the MEA 115.

As shown in FIG. 3b, in a region where the gas hole 142 is not formed, shapes of the first gasket 100a and the second gasket 100b may be modified. Thus, a height of the MEA 115 may be adjusted in the non-reaction zone 330 and the shape of the gas path 340 may be maintained.

Figure 4:
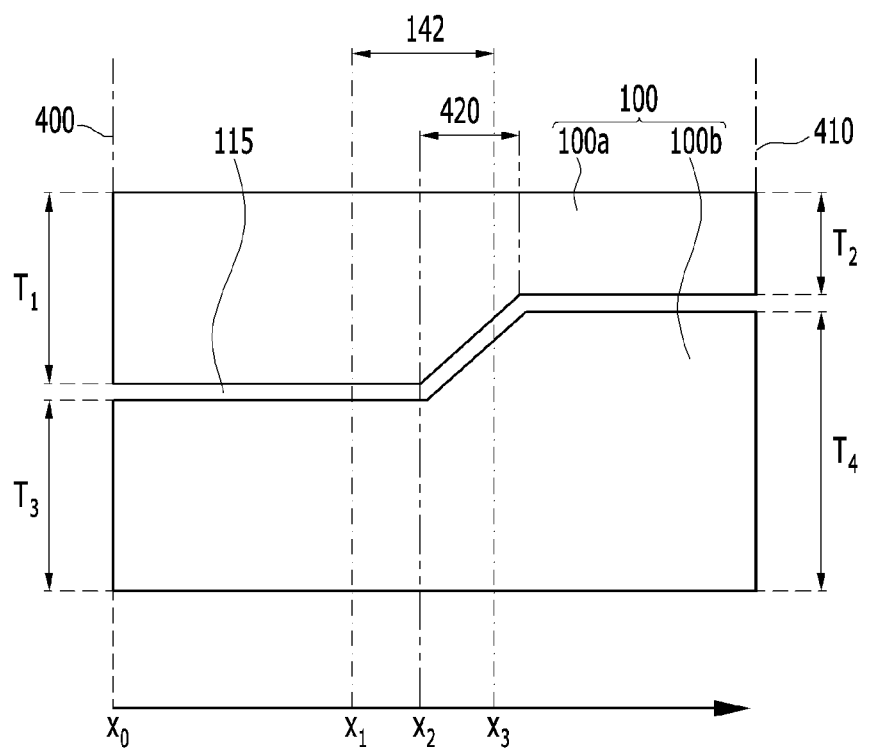
FIG. 4 is a cross-sectional view showing a shape of a gasket according to exemplary embodiments of the present disclosure.

FIG. 4 is a cross-sectional view showing a shape of a gasket according to exemplary embodiments of the present disclosure.

Referring to FIG. 4, the gasket 100 includes the first gasket 100a disposed between the first separator 304 and the MEA 115 and the second gasket 100b disposed between the separator 312 and the MEA 115.

The first gasket 100a and the second gasket 100b may have shapes corresponding to each other with the MEA 115 disposed therebetween. An outer side surface 400 of the first gasket 100a and the second gasket 100b may be formed at a side at which the hydrogen manifold 140 (or the air manifold 120) is formed and an inner side surface 410 of the first gasket 100a and the second gasket 100b may be formed at a side at which the reaction zone 320 is formed.

The outer side surface of the first gasket 100a may have a first thickness T1, the inner side surface 410 of the first gasket 100a may have a second thickness T2, the outer side surface 400 of the second gasket 100b may have a third thickness T3 and the inner side surface 410 of the second gasket 100b may have a fourth thickness T4.

An inclined portion 420 may be formed at the first gasket 100a and the second gasket 100b. A height of the inclined portion 420 may change from the outer side surface 400 toward the inner side surface 410. The rest of the gasket except for the inclined portion 420 may be formed in a horizontal direction.

In exemplary embodiments of the present disclosure, a sum of the first thickness T1 and the third thickness T3 may be equal to a sum of the second thickness T2 and the fourth thickness T4, the fourth thickness T4 may be greater than the third thickness T3 and a sum of the first thickness T1 and the third thickness T3 may be greater than the fourth thickness T4.

With respect to a virtual x-axis directed from the outer side surface 400 toward the inner side surface 410, the outer side surface may be set to X0 (a zero point), a point at which the gas hole 142 starts may be set to X1, a point at which the gas hole 142 ends may be set to X3 and a point at which the inclined portion 420 starts may be set to X2.

A length of the X3 may be longer than a length of the X2, and the length of the X2 may be longer than a length of the X1.

Figure 5A:
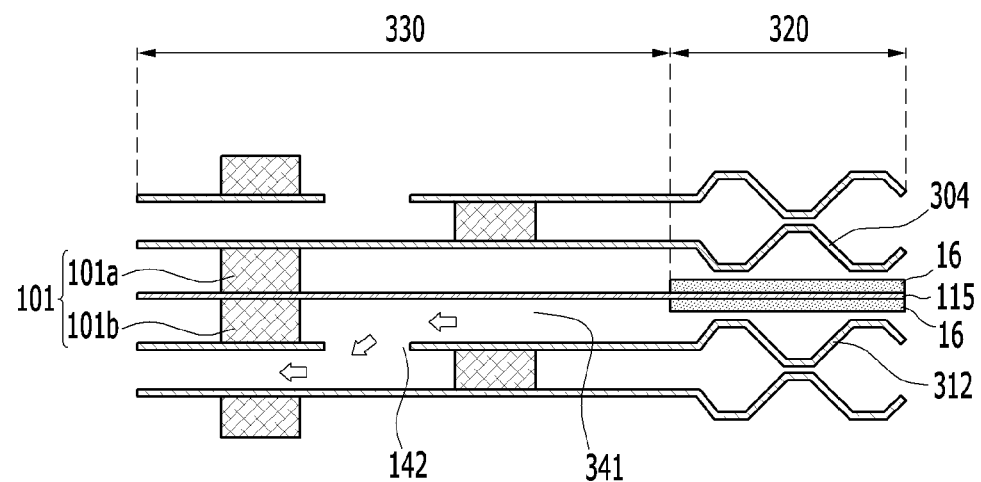
FIGS. 5a and 5b are partial cross-sectional views of a fuel cell according to the related art.
Figure 5B:
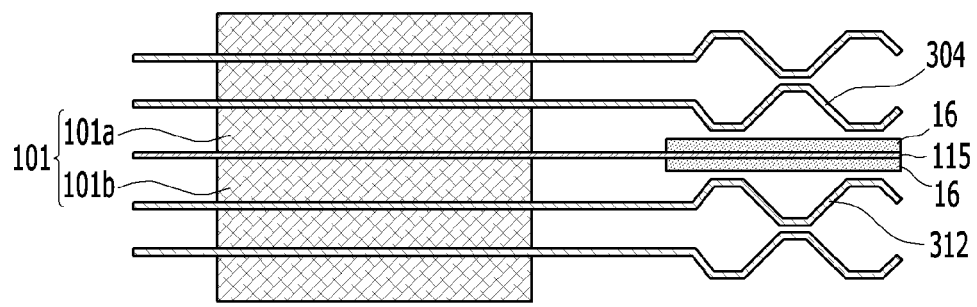

FIGS. 5a and 5b are partial cross-sectional views of a fuel cell according to the related art. A description of the same or similar parts in comparison with FIGS. 3a and 3b is omitted.

Referring to FIGS. 5a and 5b, the gas hole 142 may be formed in the non-reaction zone 330 of the second separator 312. The air or the reaction gas may be discharged from the cathode or the anode or may be supplied to the cathode or the anode via the gas hole 142.

A second gasket 101b may form a space corresponding to the gas hole 142 and may form a gas path 341 between the membrane electrode assembly (MEA) 115 and the second separator 312.

A gas path 341 may be formed at a constant height. Therefore, condensate formed in the reaction zone 320 may not be easily discharged and may stagnate to block the gas path 341. Further, a pressure difference between a supply side and a discharge side of a fuel may increase, and performance of a fuel cell stack may deteriorate.

However, as shown in FIGS. 3a and 3b, the exemplary embodiments of the present disclosure reduce unnecessary space formed between the MEA 115 and the first separator 304 corresponding to the gas path 340 and may form the flow path expansion portion by enlarging the height of the gas path so that the exemplary embodiments may easily discharge the condensate formed by the reaction gas and the air that are discharged from the MEA 115.

In addition, the exemplary embodiments may use the flow path expansion portion so that the exemplary embodiments may easily remove the condensate formed by the reaction gas and the air that are supplied to the cathode and the anode or discharged from the cathode and the anode.

While this disclosure has been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A fuel cell stack, comprising:
   a membrane electrode assembly including a cathode and an anode which are catalyst layers and are formed on a first and a second surface, respectively, of an electrolyte membrane;
   a first separator disposed at one side of the membrane electrode assembly; and
   a second separator disposed at another side of the membrane electrode assembly,
   wherein a gas path through which a gas is discharged from the cathode or the anode, or a gas is supplied to the cathode or the anode, is disposed between the second separator and the membrane electrode assembly and is in a non-reaction zone,
   wherein the gas path includes a flow path expansion portion, and a height of the flow path expansion portion is greater than a height of a reaction zone, and
   wherein a shape of the membrane electrode assembly is deformed to have the flow path expansion portion in the gas path.

2. The fuel cell stack of claim 1, wherein the flow path expansion portion includes a portion of which a height gradually increases from the gas path.

3. The fuel cell stack of claim 1, wherein the flow path expansion portion is disposed at one side surface of the membrane electrode assembly, and
   wherein a height of the another side surface of the membrane electrode assembly forming the flow path expansion portion decreases along a portion of a length of the another side surface.

4. The fuel cell stack of claim 1, wherein a gas hole connected to the gas path is formed at the second separator.

5. The fuel cell stack of claim 4, wherein the gas path discharges a fuel gas discharged from the anode or a gas discharged from the cathode.

6. The fuel cell stack of claim 4, wherein the flow path expansion portion is overlapped with part of a region of the gas hole.

7. The fuel cell stack of claim 4, wherein the flow path expansion portion is overlapped with all of a region of the gas hole.

8. The fuel cell stack of claim 1, further comprising:
a first gasket disposed between the membrane electrode assembly and the first separator in the non-reaction zone; and
a second gasket that corresponds to the first gasket and is disposed between the membrane electrode assembly and the second separator,
wherein the shape of the membrane electrode assembly is deformed according to cross-sectional shapes of the first gasket and second gasket so as to form the flow path expansion portion.

9. The fuel cell stack of claim 8, wherein a portion using the cross-sectional shapes of the first gasket and second gasket to deform the shape of the membrane electrode assembly is a secondary gasket.

10. The fuel cell stack of claim 8, wherein an outer side surface of the first gasket has a first thickness, an inner side surface of the first gasket has a second thickness less than the first thickness, an outer side surface of the second gasket has a third thickness and an inner side surface of the second gasket has a fourth thickness greater than the third thickness, and
wherein an inclined portion disposed in a region between the outer side surface and the inner side surface changes thicknesses of the first gasket and the second gasket.

11. The fuel cell stack of claim 10, wherein a sum of the first thickness and the third thickness is equal to a sum of the second thickness and the fourth thickness.

12. The fuel cell stack of claim 10, wherein a point at which the inclined portion starts with respect to a direction directed from the outer side surface toward the inner side surface is included in a region of the gas hole.

13. The fuel cell stack of claim 1, wherein the second separator is disposed at the surface, of the first surface or second surface, at which the cathode or the anode is disposed and forms a channel that passes air or a fuel gas in the reaction zone.

14. The fuel cell stack of claim 1, wherein the flow path expansion portion is located at an outlet of the gas discharged from the cathode or the anode.

* * * * *